United States Patent
Moore et al.

(10) Patent No.: US 9,593,032 B2
(45) Date of Patent: Mar. 14, 2017

(54) PRODUCED WATER TREATMENT TO REMOVE ORGANIC COMPOUNDS

(71) Applicant: General Electric Company, Schenectady, NY (US)

(72) Inventors: Brian Christopher Moore, Niskayuna, NY (US); Hope Matis, Niskayuna, NY (US); William Leonard Kostedt, IV, Niskayuna, NY (US); David M. Polizzotti, Trevose, PA (US); Matthew Alan Petersen, Niskayuna, NY (US); Jeffrey Lynn Schworm, Niskayuna, NY (US); Anthony Yu-Chung Ku, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 13/802,961

(22) Filed: Mar. 14, 2013

(65) Prior Publication Data

US 2014/0151296 A1    Jun. 5, 2014

(30) Foreign Application Priority Data

Nov. 30, 2012   (CA) .................................. 2797496

(51) Int. Cl.
*C02F 1/42* (2006.01)
*C02F 9/00* (2006.01)
(Continued)

(52) U.S. Cl.
CPC ............... *C02F 9/00* (2013.01); *C02F 1/283* (2013.01); *C02F 1/32* (2013.01); *C02F 1/385* (2013.01);
(Continued)

(58) Field of Classification Search
CPC ............ C02F 2003/003; C02F 2101/32; C02F 2103/365
(Continued)

(56) References Cited

U.S. PATENT DOCUMENTS 4,085,043 A    4/1978 Ellis
4,141,826 A *  2/1979 Alford et al. ................. 210/674
(Continued)

FOREIGN PATENT DOCUMENTS

CN    1269330 A    10/2000
CN    101679082 A   3/2010
(Continued)

OTHER PUBLICATIONS

Petersen, Matthew A., et al., Analysis of Steam Assisted Gravity Drainage Produced Water using Two-Dimensional Gas Chromatography with Time-of-Flight Mass Spectrometry, Industrial & Engineering Chemistry Research, Oct. 7, 2011, pp. 12217-12224.
(Continued)

*Primary Examiner* — Chester Barry (57) ABSTRACT

Systems and methods for removing organic contaminants from water may be used, for example, to treat produced water from a steam assisted heavy oil recovery operation. The treated produced water may be re-used to create steam. Alternatively, the produced water may be a blowdown stream treated to facilitate further treatment in a thermal crystallizer. The treatments may include pH adjustment or separating de-solubilized organics or both. Other treatments may include one or more of oxidation, sorption and biological treatments. The treatments may be used alone or in various combinations. One exemplary combination includes reducing the pH of produced water, separating de-solubi-
(Continued)

lized organics from the produced water, and oxidizing the produced water or contacting the produced water with activated carbon.

12 Claims, 6 Drawing Sheets

(51) Int. Cl.

| | | |
|---|---|---|
| C02F 1/28 | (2006.01) | |
| C02F 1/32 | (2006.01) | |
| C02F 1/38 | (2006.01) | |
| C02F 1/463 | (2006.01) | |
| C02F 1/52 | (2006.01) | |
| C02F 1/72 | (2006.01) | |
| C02F 1/78 | (2006.01) | |
| C02F 3/02 | (2006.01) | |
| C02F 3/10 | (2006.01) | |
| C02F 1/24 | (2006.01) | |
| C02F 1/44 | (2006.01) | |
| C02F 101/32 | (2006.01) | |

(52) U.S. Cl.
CPC .............. *C02F 1/42* (2013.01); *C02F 1/463* (2013.01); *C02F 1/5236* (2013.01); *C02F 1/722* (2013.01); *C02F 1/78* (2013.01); *C02F 3/02* (2013.01); *C02F 3/106* (2013.01); *C02F 1/24* (2013.01); *C02F 1/444* (2013.01); *C02F 1/52* (2013.01); *C02F 2101/32* (2013.01); *C02F 2305/026* (2013.01); *Y02W 10/15* (2015.05)

(58) Field of Classification Search
USPC ......................................... 210/615–617, 694
See application file for complete search history.

(56) References Cited

U.S. PATENT DOCUMENTS

| | | | |
|---|---|---|---|
| 4,482,459 A | | 11/1984 | Shiver |
| 4,839,054 A | * | 6/1989 | Ruebush et al. .............. 210/639 |
| 5,104,545 A | | 4/1992 | Means et al. |
| 5,266,208 A | | 11/1993 | Stahly et al. |
| 5,653,883 A | | 8/1997 | Newman et al. |
| 5,833,862 A | | 11/1998 | Holland |
| 5,922,206 A | * | 7/1999 | Darlington et al. .......... 210/693 |
| 6,045,703 A | * | 4/2000 | Miller ........................... 210/659 |
| 6,251,264 B1 | | 6/2001 | Tanaka et al. |
| 6,669,849 B1 | | 12/2003 | Nguyen et al. |
| 6,962,621 B2 | | 11/2005 | Jung |
| 6,984,292 B2 | | 1/2006 | Kresnyak et al. |
| 7,087,176 B2 | | 8/2006 | Gavrel et al. |
| 7,438,129 B2 | | 10/2008 | Heins |
| 7,578,345 B2 | | 8/2009 | Minnich et al. |
| 7,591,311 B2 | | 9/2009 | Minnich et al. |
| 7,686,079 B2 | | 3/2010 | Gamache et al. |
| 7,694,736 B2 | | 4/2010 | Betzer |
| 7,849,921 B2 | | 12/2010 | Heins |
| 7,993,529 B2 | | 8/2011 | Honji et al. |
| 8,062,530 B2 | | 11/2011 | Schoen et al. |
| 8,101,070 B2 | | 1/2012 | Theodore et al. |
| 2003/0136734 A1 | * | 7/2003 | Mirzayi et al. ............... 210/610 |
| 2005/0224338 A1 | | 10/2005 | Kin et al. |
| 2006/0108284 A1 | * | 5/2006 | Christeson .................... 210/631 |
| 2006/0157419 A1 | * | 7/2006 | Karanfil ............... B01J 20/0229 210/694 |
| 2007/0095759 A1 | | 5/2007 | Bridle |
| 2007/0102359 A1 | | 5/2007 | Lombardi et al. |
| 2008/0023401 A1 | | 1/2008 | Arato et al. |
| 2008/0223731 A1 | | 9/2008 | Lee |
| 2009/0204419 A1 | | 8/2009 | Stewart |
| 2010/0108274 A1 | | 5/2010 | Ako et al. |
| 2010/0258502 A1 | | 10/2010 | Butters et al. |
| 2011/0005284 A1 | * | 1/2011 | Conner et al. .................... 71/12 |
| 2011/0005749 A1 | | 1/2011 | Curole et al. |
| 2011/0127215 A1 | * | 6/2011 | Gencer et al. ................ 210/617 |
| 2011/0147306 A1 | | 6/2011 | Polizzotti et al. |
| 2011/0147316 A1 | * | 6/2011 | Polizzotti et al. ............ 210/705 |
| 2011/0272362 A1 | | 11/2011 | Sikes et al. |
| 2011/0297552 A1 | | 12/2011 | Boyle et al. |
| 2012/0325744 A1 | * | 12/2012 | Polizzotti et al. ............ 210/638 |
| 2014/0083942 A1 | * | 3/2014 | Jungbauer ..................... 210/631 |

FOREIGN PATENT DOCUMENTS

| | | |
|---|---|---|
| CN | 101786686 A | 7/2010 |
| CN | 101905936 A | 12/2010 |
| CN | 102452760 A | 5/2012 |
| EP | 1997782 B1 | 4/2011 |
| EP | 2397534 A1 | 12/2011 |
| FR | 2824549 A1 | 11/2002 |
| GB | 2424875 A | 10/2006 |
| RU | 2385296 C2 | 3/2010 |
| WO | 9220624 A1 | 11/1992 |
| WO | 02100509 A1 | 12/2002 |
| WO | 2010089669 A1 | 8/2010 |
| WO | 2012030427 A1 | 3/2012 |
| WO | 2012082259 A1 | 6/2012 |

OTHER PUBLICATIONS

Harvie, Allan et al., Produced Water Beneficial Re-Use—High TDS Waters, Fossil Water, Aug. 1, 2007, pp. 1-57.
Colorado School of Mines, An Integrated Framework for Treatment and Management of Produced Water, RPSEA Project 07122-12, Nov. 2009, pp. 1-158.
Hsing, Hao, Jan et al., The decolorization and mineralization of Acid Orange 6 azo dye in aqueous solution by advanced oxidation processes: A comparative study, Journal of Hazardous Materials 141 (2007) 8-16.
Rameshraja, D et al., Treatment of Tannery Wastewater by Various Oxidation and Combined Processes, Department of Chemical Engineering, Indian Institute of Technology Roorkee, 2011, pp. 1-12.
Lin, Sheng H. et al., Treatment of Landfill Leachate by Combined Electro-Fenton Oxidation and Sequencing Batch Reactor Method, Wat. Res. vol. 34, No. 17, pp. 4243-4249, Feb. 11, 2000.
Butler, Erick, et al., Electrocoagulation in Wastewater Treatment, Water, vol. 3, pp. 495-525, Apr. 6, 2011.
Li, Wei, et al., Removal of Organic Matter from Landfill Leachate by Advanced Oxidation Processes: A Review, International Journal of Chemical Engineering, Apr. 12, 2010, vol. 2010, pp. 1-10.
Pedenaud, P., et al., Oily Water Treatment Schemes for Steam Generation in SAGD Heavy-Oil Developments, SPE/PS-CIM/CHOA International Thermal Operations and Heavy Oil Symposium, Nov. 1-3, 2005, pp. 1-10.
International Search Report and Written Opinion issued in connection with corresponding PCT Application No. PCT/US2013/069530 on Jan. 31, 2014.
Chinese Office Action issued in connection with corresponding CN Application No. 201380062448.X on Jul. 4, 2016.
Chinese Office Action issued in connection with corresponding CN Application No. 201380062448.X on Dec. 17, 2015.
Russian Notice of Allowance issued in connection with corresponding RU Application No. 2015119304 on Nov. 28, 2016.

\* cited by examiner

PRODUCED WATER TREATMENT TO REMOVE ORGANIC COMPOUNDS

CROSS REFERENCE TO RELATED APPLICATIONS

This application claims the benefit of Canadian Patent Application No. 2,797,496 filed Nov. 30, 2012, which is hereby incorporated by reference.

FIELD

This specification relates to systems and methods for treating water, for example for removing organic compounds from produced water.

BACKGROUND

U.S. Pat. No. 4,839,054 describes a process for removing water-soluble organics from produced water. The process comprises acidifying the produced water, contacting the acidified water with free oil to form a mixture, agitating the mixture to produce a thoroughly mixed phase, and separating the mixed phase to produce a free oil phase and a clean water phase. In an example: cationic polymers are added to the acid tank; separation is done by induced gas flotation (IGF) after conditioning the water with two additional polymers; and the water is sent from the IGF unit through a sand filter and carbon bed.

INTRODUCTION TO THE INVENTION

This specification describes systems and methods for removing organic contaminants from water. Without limitation, the systems and methods may be used industrially to treat produced water from a steam assisted heavy oil recovery operation. The treated produced water may be re-used to create steam. Alternatively, the produced water may be a blowdown stream and be treated to facilitate further treatment, for example in a thermal crystallizer.

The detailed description describes several individual treatments. The treatments are divided for organizational purposes into Phase 1 and Phase 2 treatments. Phase 1 treatments include pH adjustment and separating de-solubilized organics. Phase 2 treatments include oxidation, sorption and biological treatments. The treatments may be used alone or in various combinations described in the detailed description. It is not necessary to use both a Phase 1 treatment and a Phase 2 treatment but if both are used the Phase 1 treatment preferably occurs before the Phase 2 treatment. One example of a combination includes reducing the pH of produced water, separating de-solubilized organics from the produced water, and oxidizing the produced water or contacting the produced water with activated carbon.

DETAILED DESCRIPTION

Some oil recovery operations use steam to assist in bringing oil to the surface. For example, heavy oil or bitumen can be extracted from the oil sands in Alberta, Canada using a steam assisted gravity drainage (SAGD) or cyclic steam stimulation (CSS) process. A mixture of condensed steam and heavy oil is produced. After separating the oil, the produced water is de-oiled and then treated before being re-used as boiler feedwater (BFW) to make more steam. The boiler is often a once through steam generator (OTSG) but optionally may also be a drum boiler.

Boiler feedwater recovered from produced water as described above contains dissolved organics frequently, but not exclusively, at a concentration in the range of about 200 to 1,000 mg/L. An OSTG generally operates at around 80% steam quality and produces a blowdown stream containing about 20% of the initial BFW volume. A packaged boiler has a higher steam quality and produces a smaller blowdown stream, but requires a higher quality feedwater. The dissolved organics in the BFW end up in one of three destinations: (1) they can volatilize and go out with the steam, (2) they can collect on the boiler walls, or (3) they can exit the boiler as part of the blowdown. The destination of a particular organic compound is affected by a number of its characteristics including: volatility, solubility, potential reactions or complexation with other (dissolved or suspended) compounds in solution, propensity to sorb onto boiler walls or a foulant layer on the boiler walls, and their proximity to the boiler walls while traveling through the steam generator.

Organics that collect on the boiler walls form a foulant layer. For boilers heated externally, this layer will act as an insulator impeding heat transfer from the burners through the boiler wall and to the water. As the foulant layer builds on the boiler walls, more energy is required to maintain constant steam production. Increased heating can lead to more fouling and yet further increases in heating. As this cycle continues there is an increasing risk of boiler tube blowout and the operators must periodically shut down the OSTG to be "pigged" to remove foulant.

Organics that exit a boiler with the blowdown can also pose problems. Disposal options for the blowdown include the following: deep-well injection, disposal into tailings ponds, cementation, and thermal evaporation and crystallization. Of these methods, disposal in tailings ponds is being restricted by permitting requirements and is already in limited use. Deep well injection poses similar challenges. One exception is injection into proven commercially operated salt caverns or deep injection well disposal mines in northern portions of Canada but transportation costs make this an expensive option. Cementation has issues associated with leaching of the cemented material and potentially high disposal costs. The final option of thermal evaporation and thermal crystallization is a viable option. However, the high organic content of the blowdown can interfere with the crystallization process. For example, the organics can render the crystallizer unit unable to produce a dry material. Evaporators can also be used to treat the produced water to produce BFW. In this case, the evaporator blowdown also contains organic contaminants that can interfere with crystallization.

By removing dissolved organics before the boiler, it may be possible to increase the steam quality, reduce the boiler energy consumption, or reduce the frequency of pigging frequency. Removing organics in boiler or evaporator blowdown may allow a crystallizer to produce a substantially dryer solid for disposal.

Most of the dissolved organics in SAGD produced water are minimally-biodegradable or essentially non-biodegradable by conventional biological treatment. For example, produced water conventionally treated to produce boiler feedwater may have a BOD5/COD ratio of under 0.3 indicating that less than 30% of the organics are biodegradable by conventional means. Organic acids as well as compounds with double bonds and aromatic rings are present. Many of the organics present in the SAGD produced water have (poly)aromatic and naphthenic (cycloalkane) structures. Organics that have aromatic moieties, or that are rich in double bonds, are difficult for microbes to degrade.

Most of the organic compounds in produced water appear to have a molecular weight (MW) of less than 500. The low molecular weight suggests that conventional coagulation and flocculation will not remove significant TOC. This has been confirmed through our laboratory experimentation.

Various systems and processes will be described below for removing organics from produced water. These systems and processes may be used, for example, to treat produced water from a steam assisted heavy oil recovery operation for re-use as boiler feedwater in the same oil recovery operation. For further example, these systems and processes may be used to treat boiler or evaporator blowdown in a heavy oil recovery operation.

In the description below, process steps will be divided into Phase 1 and Phase 2 treatments. A complete process may have one or more Phase 1 treatments, one or more Phase 2 treatments, or a combination of Phase 1 and Phase 2 treatments. In a process having Phase 1 and Phase 2 treatments, the one or more Phase 1 treatments preferably precede the one or more Phase 2 treatments. In some cases, the Phase 1 treatment is selected to provide produced water with characteristics adapted to enhance the Phase 2 treatment.

In the description below, references to produced water include water derived from a larger produced water stream such as boiler and evaporator blowdown streams. Particularly in a case where the process steps are applied upstream of a boiler, the produced water may also be the effluent produced from one or more pre-treatment steps such as de-oiling and warm lime softening. The process steps may also be placed at the end or within a set of other produced water treatment steps. One preferable location could be after warm or hot lime softening but prior to treatment with a cation exchange resin. In this location, fouling of the ion exchange resins by organic contaminants would be reduced. Alternatively, another favorable location may be prior to lime softening, where pH is closer to neutral (often 7-8) and less acid is needed to reduce the pH, for example to about 4 (and subsequently bring it back up to pH 7-8 where it began). The process steps in a combination described below do not necessarily follow each other directly, but instead may have other process steps in between them.

In the description below, the produced water samples used in experiments were obtained from a SAGD heavy oil extraction operation in Alberta, Canada. These samples had previously undergone a gravity separation process, walnut shell filtration, lime softening and weak acid cation exchange. The produced water was intended for re-use as boiler feedwater.

Phase 1 Treatment

In Phase 1, the pH of the produced water is reduced. The pH reduction de-solubilizes at least some organic compounds and may also provide a pH more suitable for a Phase 2 process. The de-solubilized organics may be referred to as solids for convenience but there may be liquid droplets as well as solid particulates. Optionally, de-solubilized organics may be separated from the pH reduced produced water. In some cases, a Phase 2 process also includes a step of removing organic solids but it is still optional to separate solids from the produced water in Phase 1 as well. The pH is preferably increased before the produced water is fed to a boiler. SAGD boiler feedwater is preferably rather alkaline with pH>9, and often >10, for boiler integrity.

Without intending to be limited by theory, when the pH of produced water is reduced, a portion of the dissolved organics lose their solubility and form droplets or particulates. The reason for this may be that many of the organics have acid functional groups. These groups are de-protonated at typical produced water pH values. Deprotonated acid groups give the organics solubility in water. As the pH is lowered, these groups become protonated, decreasing the solubility of many of the organics and causing them to come out of solution.

The produced water being fed to the Phase 1 treatment process may have a pH of 9 or more. Reducing the pH to 7 or less facilitates some Phase 2 treatments or causes some organic compounds to de-solubilize or both. Reducing the pH to 6 or less, or 5 or less, de-solubilizes more organic compounds. The pH may be reduced to as low as 3, but chemical consumption and corrosion become concerns when the pH is reduced below 4. The pH of the produced water may be reduced to be in the range of about 3 to 7 or in the range of about 4 to 6.

As the pH of the produced water is decreased, a portion of the organics will come out of solution. In one test, a sample of produced water was acidified to a pH of about 3 at room temperature. Floating solids (rag layer) appeared at the surface of the sample, solids floc particles were visible in suspension, and the sample had a lighter color. Solids were removed by filtration through a 0.45 micron filter. Total organic carbon (TOC) analysis of the filtered water indicated that about 17% of the organic compounds in the produced water had been removed. In another test, a sample of the produced was acidified but kept at about 80 degrees C. In this sample, the solids did not agglomerate into visible individual particles or form a floating rag layer. However, solids had formed and could be removed by filtration through a 0.45 micron filter.

The organics that came out of solution upon pH reduction were less biodegradable than the organics that stayed in solution. A mild increase in the BOD5/COD ratio of the produced water was observed after reducing the pH and filtering out the solids.

Figure 1:
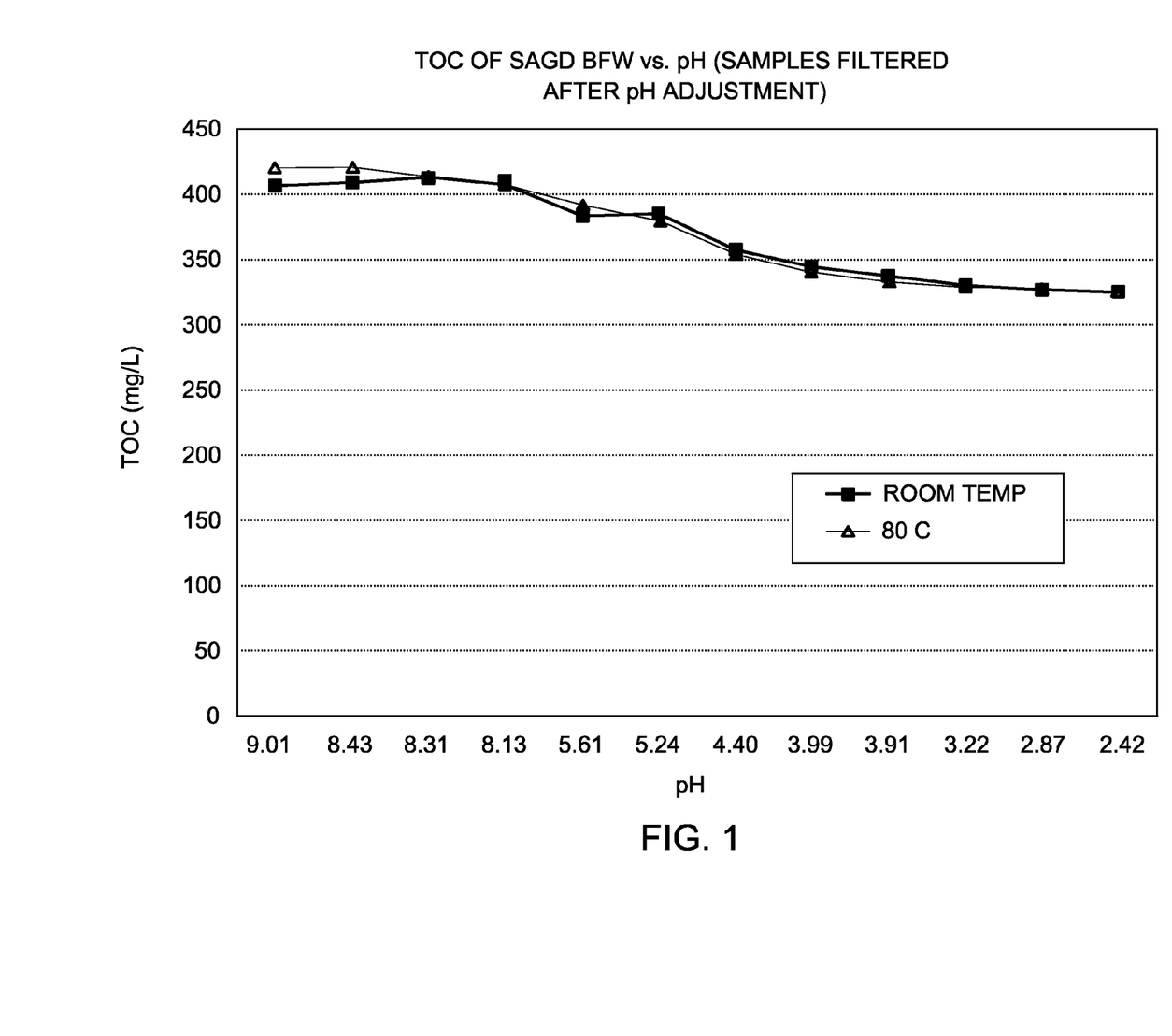
FIG. 1 is a graph showing total organic carbon (TOC) of produced water samples after pH reduction and filtration.

FIG. 1 shows the results of tests performed at room temperature (23 degrees C.) and at 80 degrees C. at various pH values. The produced water had an initial pH of about 9.4. Samples at lower pH values were produced by mixing in various amounts of 10% HCl solution to produce the pH values indicated in FIG. 1. The sample at each pH was then split into two samples. One group of samples was held at about 80 degrees C. for 24 hours while the other group of samples was held at about 23 degrees C. for 24 hours. The samples were then filtered through 0.45 micron filters. Water passing through each filter was analyzed by a TOC analyzer. TOC (ug/g) was determined by subtracting IC (inorganic carbon; ug/g) from TC (total carbon; ug/g). As indicated in FIG. 1, TOC reductions occurred in the samples prepared at pH of 5.6 and below and lower pH samples showed further reductions in TOC. However, only a small additional amount of TOC was removed in the samples with pH reduced below 4. Almost no further TOC was removed in the samples with pH reduced below 3. TOC removal appears to be essentially independent of temperature. However, as indicated above, the suspended organics are less agglomerated at higher temperature and do not settle unaided.

The de-solubilized organics are preferably separated from the produced water. De-solubilized organics can be removed, for example, by way of any of the following means: flotation, air/bubble assisted flotation, chemical precipitation (including, but not limited to processes such as cold lime softening, warm or hot lime softening, precipitation with ferric- and aluminum-based salts, sulfide precipitation, electrocoagulation, flocculation with polymers), filtration (including but not limited to sand, membrane, media, cartridge, cloth/fiber/mesh, bag, vacuum, depth filters), adsorption/absorption (including but not limited to organoclay, organophillic polymers, MyCelx™, OSorb™, coal, char, biochar, alumina), and centrifugal devices.

Some organics de-solubilized by pH reduction at room temperature may settle in the produced water while others may float. However, the produced water is typically hot, for example about 70 to 95 degrees C., and will be used to produce steam or treated further in a thermal crystallizer. It is preferable to work at an elevated temperature, for example 70 degrees C. or more, to avoid consuming energy cooling and re-heating the produced water. At these temperatures, it may be difficult to float or settle de-solubilized organics. Accordingly, the separation step is preferably suited for removing fine suspended solids. For example, the produced water may be filtered with a ceramic membrane filter. Alternatively, the produced water may be treated with a chemical intended to induce the formation of organic and/or inorganic floc including, but not limited to anionic or cationic polymers, coagulants or flocculants.

Phase 2 Treatment

In Phase 2, soluble organics, or soluble organics remaining after Phase 1 treatment, are removed from the produced water. If the pH of the produced water has been reduced in a Phase 1 treatment, the Phase 2 treatment preferably operates well at a low pH. It is also preferable to work in Phase 2 at an elevated temperature, for example 70 degrees C. or more, to avoid consuming energy cooling and re-heating the produced water. Two suitable methods are oxidation and sorption. Optionally, oxidation or sorption may be combined with each other or other types of treatment such as biological treatment.

Regarding sorption, contacting produce water with activated carbon is effective for removing dissolved organics. The carbon should preferentially remove organics with the least solubility in water. Without intending to be limited by theory, the less soluble organics are believed to be the organics with the greatest potential to deposit on boiler walls. Treatment with activated carbon preferably, but not necessarily, follows Phase 1 pH reduction and solids separation to produce a combined process having: (1) acidification of the produced water, (2) removal of de-solubilized organics, and (3) adsorption with activated carbon.

Figure 2:
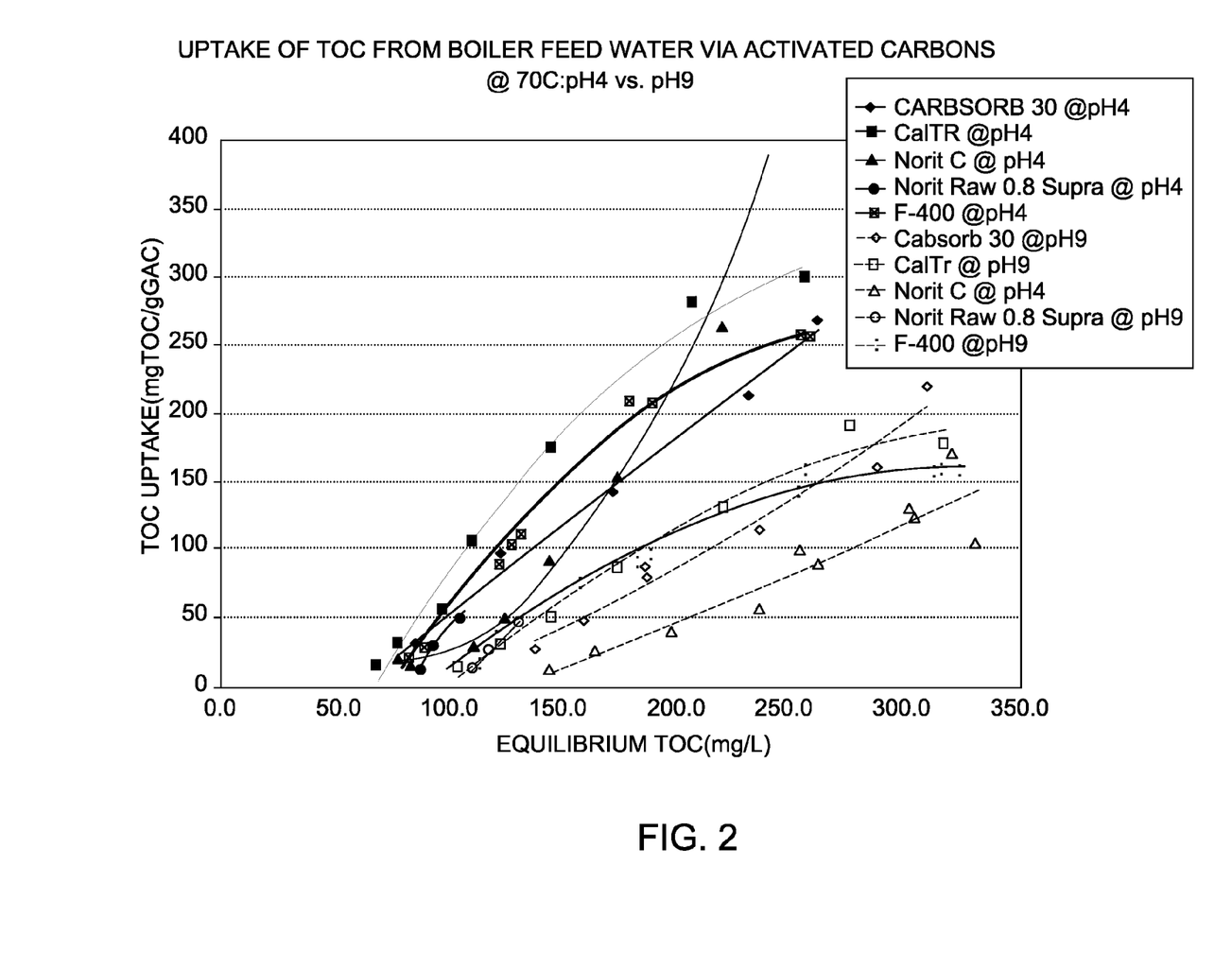
FIG. 2 is a graph showing uptake of TOC from produced water sample by various commercially available types of activated carbon at two pH values.

Referring to FIG. 2, adsorption by various commercially available activated carbon samples was compared at pH 4 and pH 9. The adsorption performance was better at pH 4 than at pH 9. The carbon type also affected performance. This may be related to the carbon pore structure and/or surface chemistry and/or precursor material type and/or activation method.

Produced water may be fed to a carbon bed at a pH between 2 and 11 but pH of about 4-6 is preferred. The temperature of the produced water fed to the carbon may be between 20 and 100 degrees C. but a temperature of 70-95 degrees C. is preferred.

Carbon may be used: (i.) with net-basic, -neutral, or -acidic surface charges, (ii.) with pH of point of zero charges in the range of 3 to 11, (iii.) that are physically activated (for instance, with steam or CO2) or chemically activated (for instance, with KOH), (iv.) made from coal, wood and plant-based products (including but not limited to coconut shell, walnut shell, peach stones, olive stones, rice, hulls), petroleum based materials (including but not limited to pitch, polymers, rubber, refinery by-products), organic-rich waste products (including, but not limited to tires, plastic), (v.) with BET surface areas >400 m2/g. Carbon may be used, for example, in the forms of granular activated carbon, powdered activated carbon, or activated carbon fibers.

In further tests, isotherm data was collected for 14 types of commercially available activated carbon used to adsorb organic contaminants from produced water samples. In addition, the surface charge and pore size distribution was determined for each carbon type. The organic removal data was compared with the charge and pore size properties to determine if there was a statistically significant correlation (high R-squared) between these properties and organic removal. Most carbon types were able to achieve about the same extent of total TOC removal (about 50-80 mg/L of TOC remaining), but exhibited differing efficiencies for removing TOC at higher residual TOC levels (e.g. 100 mg/L); as an example, see FIG. 2. In our experiments, the ideal pore size range appeared to be about 10-20 Angstroms or 12-17 Angstroms. Preferably 50% or more of the pores by number are in one of these ranges. A more positively charged surface also seemed preferable. These properties are affected by precursor material and activation procedure. A preferred carbon can be obtained by selecting or manufacturing activated carbon with the desired characteristics.

Surface charge was determining by a titration method. A carbon with a pH of point of zero charge greater than 7.0 is considered to have a positively charged surface. At pH 4, net surface charge did not have a strong correlation, but the activated carbon with the worst results for equilibrium TOC had the least positively charged surface and the activated carbon with the most positively charged surface performed well. At pH 9, the activated carbon with the most positively charged surface also performed better than the activated carbon with the least positively charged surface. At pH 9, there was a correlation (R-squared value) of 0.3 between adsorption and positive surface charge. Without intending to be limited by theory, it is possible that the ability to electrostatically attract negatively charged organics (i.e., net positive surface charge) is beneficial, but only affects one fraction of the total organics in the produced water.

Pore diameter was investigated in IUPAC increments (0-20, 20-500, >500 A) and in narrower ranges. The results indicate that pore diameter is statistically significant with regard to equilibrium capacity. The R squared value is 0.74 when comparing maximum adsorption capacity to a pore diameter range of 10-20 A. The R squared value increase to 0.78 for a pore size range of 12-17 A.

It is possible that sorption may be provided alternatively by other sorbents. Other sorbents might include (but are not limited to) resins, organoclay, zeolites, activated alumina, biochar, MycelX or Osorb. However, in tests with produced water samples, activated alumina reduced TOC to only about 200 mg/L at pH 4 and to only about 250 mg/L at pH 9 even at adsorbent loading rates of less than 50 mgTOC per gram of sorbent.

As noted above, the organics that came out of solution upon pH reduction were less biodegradable than the organics that stayed in solution for the water we evaluated. We have also found that activated carbon (AC) treatment preferentially removes non-biodegradable organics based on an increase in the BOD5/COD ratio following carbon treatment for the produced water used in these experiments. In one set of experiments, we evaluated TOC, BOD5, COD, and BOD5/COD for a BFW sample before and after pH adjustment, as well as following AC treatment. Following AC treatment at pH 4 and pH 9, the water had a considerably lower organic content as well as a higher BOD5/COD ratio as compared to the samples prior to AC treatment.

The high temperatures of SAGD produced waters would kill microbes found in typical biological treatment processes. Temperatures of 20-35 degrees C. are preferred for traditional biological treatments of wastewater such as activated sludge, membrane bioreactors (MBRs) and rotating biological contactors (RBCs), to name a few. However, thermophilic (up to 80° C.) and extreme thermophilic (>80° C.) bacteria thrive at elevated temperatures and can be used to treat produced water at its typical temperature of 70 to 95 degrees C. Thermophilic and extreme thermophilic bacteria can be cultured from bacteria found in natural thermophilic environments or from commercially available bacteria cultures. While treatment at 70 to 95 degrees C. would avoid cooling and re-heating steps, the produced water could optionally be treated at a lower temperature where traditional bacteria can be employed.

Bacteria grown on activated carbon, also known as biologically activated carbon (BAC), can be used to degrade a portion of the organic matter in the produced water. The BAC can use either granular activated carbon or activated carbon fibers as the support material for the bacteria, although granular activated carbon is preferred. The bacteria can be seeded in a carbon bed prior to or during operation. Alternatively, the bacteria may be seeded prior to delivering the activated carbon to the site. The GAC provides a combination of biological treatment as well as adsorption onto the carbon with some of the adsorbed organics being subsequently degraded by bacteria.

The BAC process may include adding sulfur or other nutrients, or organics (e.g. methanol) to support bacteria growth. Further, pH adjustments (upward or downward) may be made prior to or during BAC treatment to support bacteria growth.

BAC may be used alone, or with one or more of: pH adjustment (to a pH between 2 and 10; but preferably 3-6); de-solubilized organics removal; and, activated carbon (AC) treatment. Some potential combinations include: pH adjustment+AC treatment+BAC treatment; pH adjustment+BAC treatment+AC treatment; pH adjustment+BAC; pH adjustment+de-solubilized organic removal+AC treatment+BAC treatment; pH adjustment+de-solubilized organic removal+BAC treatment+AC treatment; pH adjustment+de-solubilized organic removal+BAC treatment; AC treatment+BAC treatment; BAC treatment; de-solubilized organic removal+BAC; de-solubilized organic removal+AC+BAC; and, de-solubilized organic removal+BAC+AC. Where BAC is used in combination with pH adjustment and/or de-solubilized organic removal and/or AC it is not required that these processes occur immediately sequential to one another. It may be preferable if these processes were not used sequentially. As one example, AC treatment may be followed by lime softening and then followed by BAC treatment.

An anion exchange resin can alternatively be used to remove organics alone or in combination with activated carbon. Without intending to be limited by theory, produced water has several types of organic molecules. Some of the organics have oxygen-containing functional groups. Benzoic acid or phenolic functional groups on aromatic organics may be partially or fully dissociated at a pH of 9 to 10 resulting in a negatively charged species. The ion exchange resin removes organics with carboxylic or other negatively charged functional groups, some of which may be highly water soluble and difficult to remove with activated carbon. However, further analysis indicates that there are other aromatic and aliphatic organics that do not contain oxygen functional groups and have no charge. These molecules are removed well by activated carbon. Since the two media remove different fractions of organics, combining them results in a greater percent removal than using either media alone. The anion exchange resin may also prevent some of the high molecular weight compounds from reaching the activated carbon, clogging its pores and reducing its effectiveness upon reactivation. However, ion exchange may also be used by itself or activated carbon adsorption may be used prior to ion exchange. Phase 1 treatment may optionally be provided before any of these sorption options.

In tests, anion exchange resin (Amberlite IRA-958) as received was mixed with produced water having an unadjusted pH of about 9.6 and an initial TOC of about 300 mg/L. The mixed sample was kept on a shaker table at 70 degrees C. for 14 hours. After this time, the resin was removed by passing the sample through a glass fiber filter. Following this resin treatment, powdered activated carbon (PAC) (Calgon F-400) was mixed with the produced water for two hours at 70 degrees C. TOC was measured before resin treatment, after resin treatment and after PAC treatment. Treating about 125 g of produced water with 1 g and 3 g of anion exchange resin produced TOC reductions of 15-20% and 30-32% respectively. A trial without resin but using 40 mg of PAC produced a TOC reduction of 56%. Table 1 gives the result of four further trials in which resin and PAC were combined. As indicated in Table 1, anion exchange resin followed by activated carbon treatment without Phase 1 treatment removed up to 80% of the TOC in the produced water. When the anion exchange resin was pretreated to remove residual organics and inorganics and to make sure that it was fully saturated with chloride ions, the performance was greater. The pretreatment involved rinsing with methanol, cycling with 0.1 M NaOH and 0.1 M HCl, then rinsing with 1M NaCl, then de-ionized (DI) water and dried in a vacuum oven (this procedure is from Bolto, et al., Water Research (2002) 36, 5057-5065). The TOC removal with the anion exchange resin used alone but after pretreatment of the resin was 68% taking the TOC from 363 mg/L to 116 mg/L.

TABLE 1

| Dosage-mg anion exchange resin/mg PAC | % TOC reduction |
| --- | --- |
| 1000/400 | 69 |
| 1000/1400 | 74 |
| 3000/400 | 75 |
| 3000/1400 | 80 |

In place of the mixing vessels described above, the produced water may pass through an ion exchange column. After passing through the ion exchange column, the produced water may pass through an organoclay column, an activated carbon column or both. The ion exchange column may be regenerated periodically with salt solution. A regeneration brine is produced containing the removed organics and may be treated further or discharged.

Optionally, the anion exchange resin may be a magnetic anion exchange resin (MIEX). In one configuration, MIEX is mixed with the produced water in a tank. An outflow from the tank passes through a magnetic separation tank to separate the MIEX from the produced water. Optionally, the produced water may be further treated with organoclay, activated carbon or both. The MIEX is regenerated with NaCl. The regenerated MIEX is sent back to the mixing tank while a regeneration brine containing the removed organics is sent for further treatment or disposal.

As an alternative or supplement to sorption, the organics in the produced water may be oxidized. Oxidation may be achieved by physical methods, such as ultra-violet (UV) radiation, or by chemical methods such as Fenton's oxidation, ozone, or a combination of ozone and hydrogen peroxide. Fenton's oxidation may be combined with electrocoagulation. UV treatment may be combined with enhancing agents such as titanium dioxide, hydrogen peroxide or ozone. Oxidation preferably, but not necessarily, occurs after pH reduction and solids removal according to Phase 1 treatment. Fenton's oxidation in particular benefits from a prior pH reduction. The resulting process may comprise: (1) acidification of the produced water, (2) removal of de-solubilized organics, and (3) oxidation of remaining organics.

Produced water samples had an initial tan color similar to tea. Through ozone treatment, this color was completely eliminated in some experiments, and almost completely eliminated in others. When the ozone treatment was combined with the addition of hydrogen peroxide, the TOC reduction increased. Fenton's oxidation provided TOC removal similar to ozone combined with hydrogen peroxide. UV-based processes were less effective but removed some organics.

During oxidation, organics are degraded, generally adding oxygen groups to the reaction byproducts. These degraded organics may have reactivity toward advanced oxidation processes (AOPs), enabling further degradation with continued treatment with AOPs. Conversely, these degraded organics may have lessened reactivity towards AOPs. Even if not removed, the reacted organics generally have greater solubility in water which reduces their tendency to foul a boiler.

Fenton's oxidation uses reactions (1) and (2) below to produce radicals through the addition of iron and hydrogen peroxide. These radicals react with and break bonds in the organics. This can result in partial degradation of the organics; in some cases the organics are at least partially mineralized to carbon dioxide and water.

(Fe2+)+(H2O2)+organics; (Fe3+)+(OH*)+(OH−)    reaction (1)

(Fe3+)+(H2O2)+organics; (Fe2+)+(OOH*)+(H+)    reaction (2)

Fenton's oxidation was applied to a produced water samples having a pH of 3 and TOC of about 290 mg/L. The samples were mixed with iron and hydrogen peroxide and allowed to react for 4 hours. Reductions in TOC were measured with hydrogen peroxide dosages of 600 ppm (0.5:1 H2O2:COD) and above combined with H2O2:Fe ratios of 100 and under. Maximum TOC removal rates of 40-50% were achieved with dosages of 3600 ppm hydrogen peroxide (3:1 H2O2:COD) combined with a H2O2:Fe ratio of 10:1. Samples were tested at 80 degrees C. and room temperature. The results were essentially independent of temperature except that the samples at 80 degrees C. showed almost no difference in performance with H2O2:Fe ratios of up to 100:1 whereas the lower temperature samples showed significantly decreased performance at the higher ratio. TOC removal did not improve at higher hydrogen peroxide dosages indicating that the radicals may be reacting with each other, that the remaining TOC is resistant to Fenton's oxidation, or both. Further tests were conducted at 80 degrees C. and 3600 ppm of H2O2. In one trial, the iron and hydrogen peroxide were added in a single dose. In a second trial the hydrogen peroxide was added incrementally. In a third trial, both the hydrogen peroxide and iron were added incrementally. The results are shown in Table 2. The TOC reduction was about 50% regardless of whether the reagent was added in a single does or incrementally. It is noted that overall TOC removal percentages can be improved when Phase 1 treatment is performed prior to Fenton's oxidation.

TABLE 2

| Sample | TOC(ppm) | % reduction |
| --- | --- | --- |
| Raw BFW | 300 | |
| Single-dose | 157 | 47.7 |
| Incremental H2O2 | 156 | 48.0 |
| Incremental H2O2/Fe | 152 | 49.3 |

Optionally, Fenton' oxidation may be combined with electrocoagulation (EC). The electrocoagulation cell has an iron electrode. As an electrical current is applied to the EC electrodes, dissolved iron is produced by corrosion of the iron electrode. Electrocoagulation on its own resulted in only about a 15% reduction in TOC of a produced water sample. However, adding hydrogen peroxide to the produced water in the EC reactor causes Fenton's oxidation. The amount of iron powder that needs to be added to the produced water (to facilitate Fenton's oxidation) is reduced or eliminated. The EC reactor may be operated with a constant voltage and amperage that varies with the ionic strength of the sample.

A combination of Fenton's oxidation and EC was tested with produced water having pH values of 3, 5.5 and 7. The net TOC removal after 5 minutes of treatment was about 65% for pH 3; about 35% for pH 5.5; and about 15-20% for pH 7. TOC was removed at all pH values but the pH of the produced water is preferably reduced to between 3 and 5.5 before being fed into the combined Fenton's oxidation and EC process. Such a pH reduction may be made according to Phase 1 treatment with de-solubilized organics removed before the combined Fenton's oxidation and EC treatment. However, the Phase 1 solids separation step may also be omitted. Organics de-solubilized by reducing the pH of the produced water can alternatively be removed by entrapment in floc produced by the EC process. Even without prior solids separation, the reduction in dissolved organics with lowered pH reduces the amount of dissolved TOC to be attacked by the Fenton's oxidation derived radicals, which reduces the amount of hydrogen peroxide needed.

The combined Fenton's oxidation and EC process may optionally be further combined with a sorbent such as, but not limited to, activated carbon or powdered organoclay. Organoclay is useful for removing free oil or free-phase organic droplets from the produced water. Free-phase organics may remain in the produced water despite upstream treatments or be produced when the pH of the produced water is reduced. Activated carbon is useful for removing remaining dissolved organics. Organoclay may be used upstream of the activated carbon to prevent organic droplets from plugging the activated carbon bed or depleting the adsorption capacity of the activated carbon. When powdered adsorbent addition is combined with EC-Fentons, the overall TOC removal can improved yet further. The EC process can be used to remove suspended adsorbents such as powdered activated carbon.

Although a low pH is beneficial because it causes some organics to de-solubilize, and also benefits Fenton's oxidation and activated carbon adsorption, the low pH may also cause residual iron from EC to be left in the produced water. If this occurs, the pH of the produced water may be increased during a later part of the EC treatment or after the produced water exits the EC treatment. For example, if this treatment is done prior to lime softening, the residual iron could be removed during lime softening.

Compared with ordinary Fenton's oxidation, a combination of EC and Fenton's removes a similar portion of the TOC but the reaction kinetics of the combination were observed to be about an order of magnitude faster in our experiments. Maximum removal was achieved in 5 minutes or less; however, the process is not limited to treatment durations of 5 minutes or less. The faster kinetics observed with combining EC and Fenton's allows for a much smaller reactor to be used. Further, traditional Fenton's oxidation leaves iron in solution which would need to be removed before the produced water is fed to a boiler. While produced water treatment plants may have weak acid cation exchange units that might remove this iron, it would lead to more rapid exhaustion of the bed or reduce the efficacy of the cation exchange unit for hardness removal. When used in combination with EC, the iron resulting from Fenton's oxidation is beneficially removed with floc in the EC reactor, although a pH adjustment may be needed to drive the removal of the dissolved iron. Optionally, an alternative oxidation process may be used separate from or in combination with EC.

Oxidation may also be performed with other chemical oxidants. For example, the produced water may be treated with ozone or a combination of ozone and hydrogen peroxide. In these cases, residual ozone and dissolved oxygen should be removed before the produced water is sent to a boiler.

In trials, ozone bubbling alone for 30 minutes reduced the TOC of produced water by about 25% in produced water samples having an initial pH of about 9.8. Adding up to 4000 ppm of $H_2O_2$ to the samples increased TOC reductions to about 65%. The amount of additional TOC reduction increased with $H_2O_2$ dosage. The pH of the produced water was not controlled during these trials and decreased to about 8. 100 minutes of ozone bubbling increased the BOD5/COD ration of the produced water from about 0.27 to about 0.37 indicating that ozone may be useful before biological treatment.

Any of these oxidation processes may be followed by biological treatment. The biological treatment may be in an attached or suspended growth configuration. For instance, biological treatment may be achieved with biological activated carbon, moving bed bioreactor (MBBR), rotating biological contactors, or other attached growth system. As further examples, biological treatment may be achieved via traditional activated sludge, membrane bioreactor (MBR), or other systems where biomass is suspended in solution (via mixing, agitation, aeration, etc.).

Figure 3:
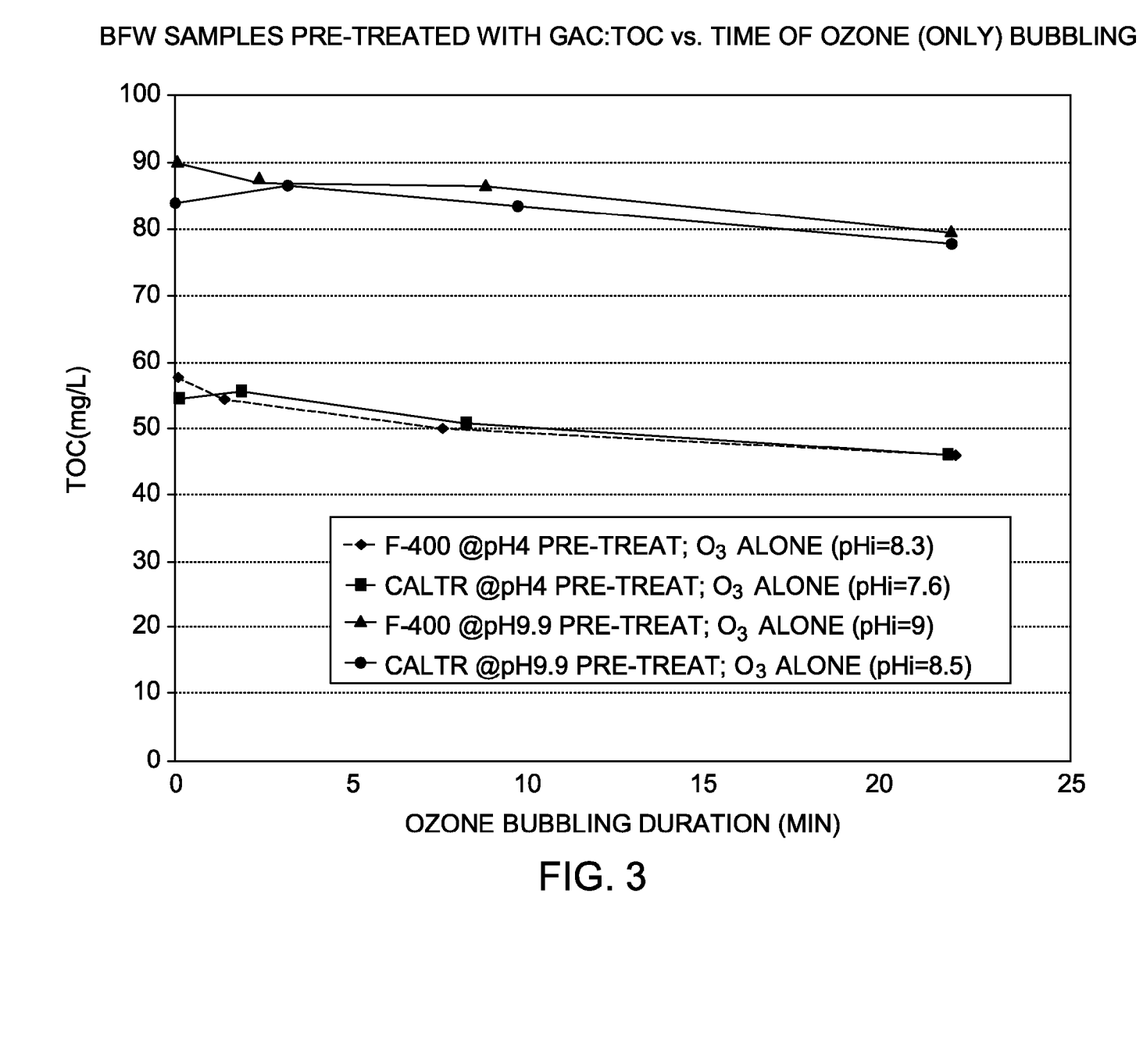
FIG. 3 is a graph showing TOC removal from produced water samples by activated carbon treatment followed by ozone.
Figure 4:
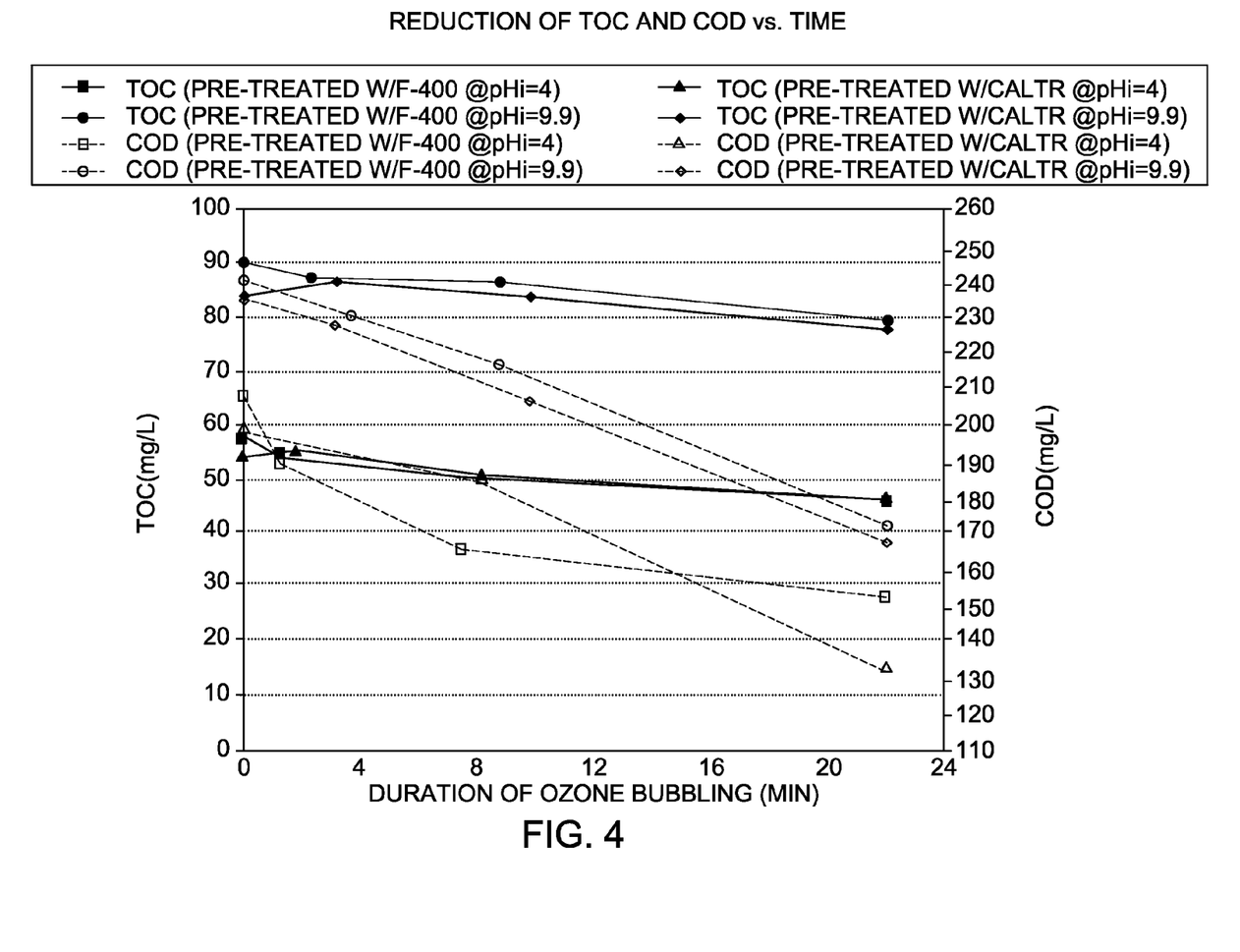
FIG. 4 is a graph comparing TOC versus COD removal by the treatments in FIG. 3.
Figure 5:
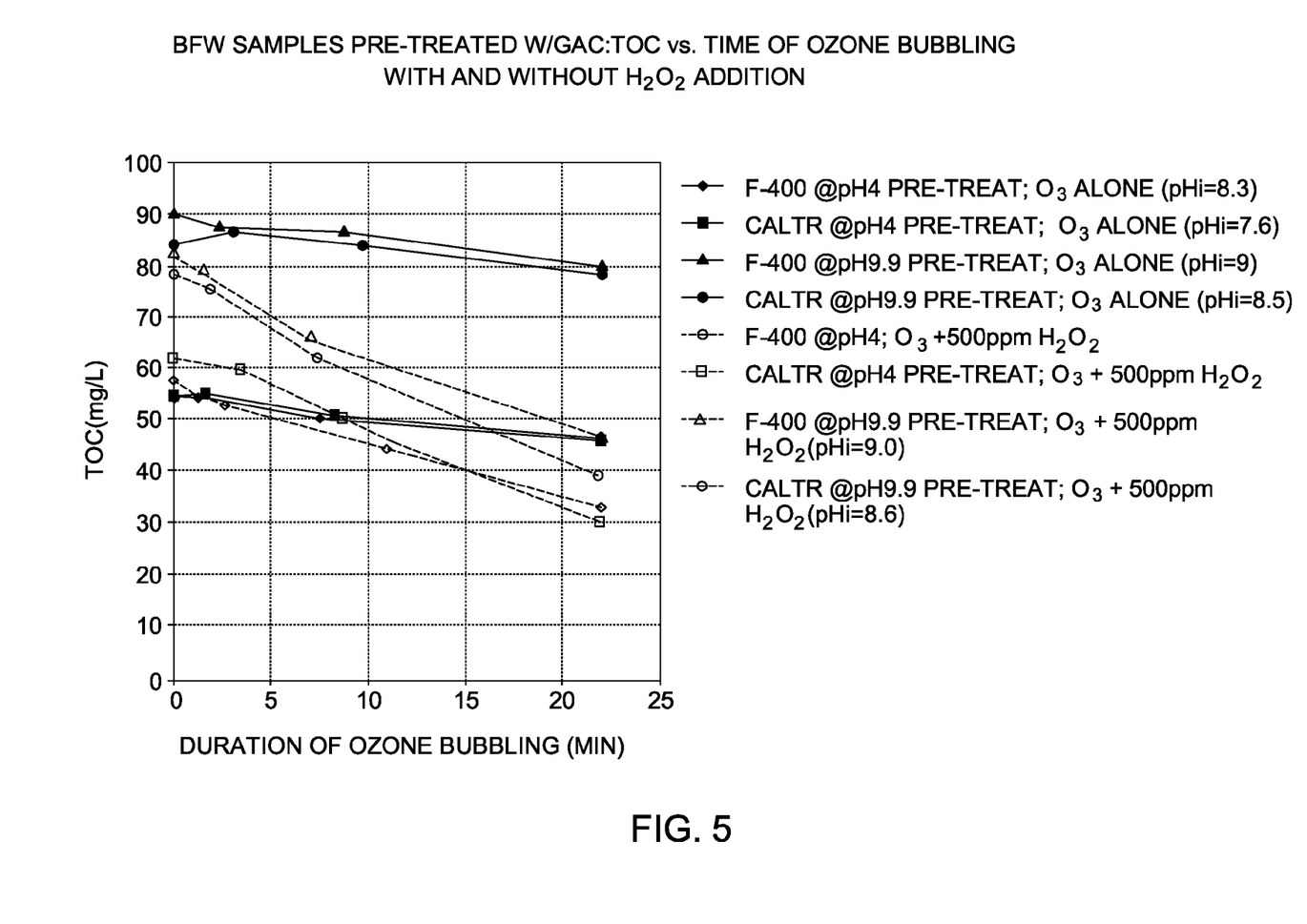
FIG. 5 is a graph showing TOC removal from produced water samples by activated carbon treatment followed by ozone with and without hydrogen peroxide.
Figure 6:
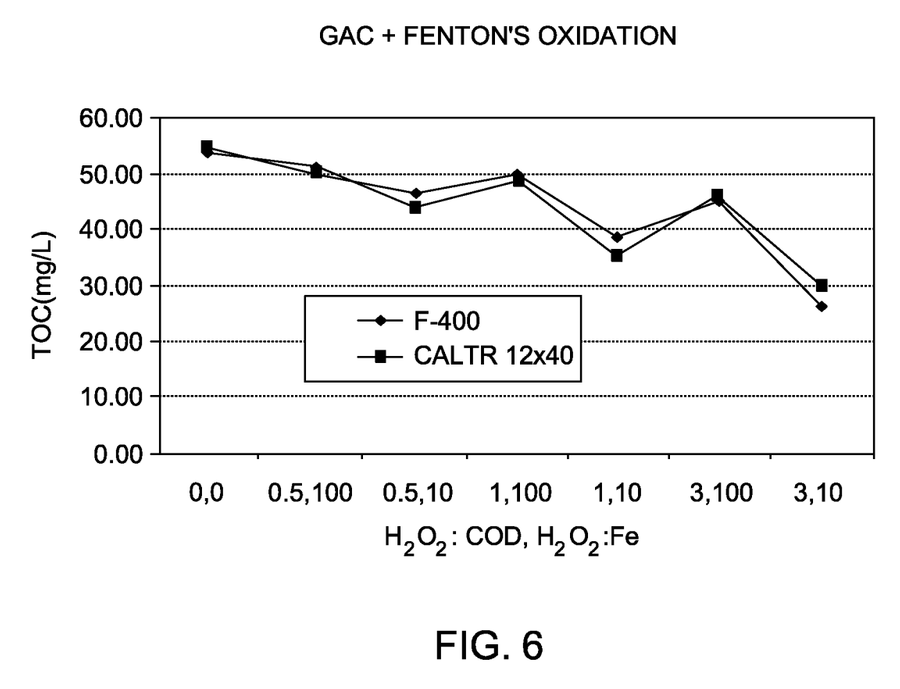
FIG. 6 is a graph showing results of TOC removal from produced water samples treated by pH reduction, activated carbon and Fenton's oxidation.

Oxidation treatments may also be provided after activated carbon treatment. For example, ozone bubbling for 25 minutes after GAC treatment resulted in an additional 10 mg/L TOC removal at pH values of about 4 and 9 (FIG. 3). The reduction in COD was noticeably greater than the reduction in TOC (FIG. 4). When ozone bubbling was combined with 500 ppm $H_2O_2$, the additional TOC removal increased to over 25 mg/L with a larger reduction at higher pH (FIG. 5). For example, at pH 4, GAC treatment reduced the TOC of a produced water sample to about 55 mg/L. Following 25 minutes of ozone bubbling and treatment with 500 ppm $H_2O_2$, TOC was reduced to about 30 mg/L. At pH 9, GAC treatment resulted in TOC of 82 mg/L. After 25 minutes of ozone bubbling and addition of 500 mg/L of $H_2O_2$, TOC was reduced to about 37 mg/L. In other trials, a produced water sample was adjusted to pH 4 and then treated with activated carbon. The resultant water had a pH of about 7 and TOC of about 53 mg/L. This effluent was treated further by Fenton's oxidation. After Fenton's oxidation at an $H_2O_2$:COD ratio of 3 and $H_2O_2$:Fe ratio of 10, TOC was reduced to less than 30 mg/L (FIG. 6). In the Figures, F-400 is activated carbon from Calgon and CALTR is activated carbon from Caltreat.

Oxidation may also be produced by applying ultra-violet (UV) radiation to produced water containing a reagent to produce hydroxyl radicals. The reagent may be, for example, one or more of hydrogen peroxide, ozone or titanium dioxide. The radicals can mineralize a portion of the organics to carbon dioxide, water and mineral acids. Radical production is aided by reducing the pH of the produced water, for example to 4. In one trial, Treating produced water at a pH of 4 with $TiO_2$ and UV radiation preceeded by treatment with granular activated carbon reduced TOC from about 350 mg/L to about 60 mg/L.

Adsorption onto synthetic resins that are steam-regenerable is another adsorption option. Reactivation of activated carbon typically requires two steps: charring followed by activation with steam. In contrast, synthetic resins may not require the charring step and could be reactivated at a lower steam temperature than activated carbon. Removal of TOC by one synthetic resin (Ambersorb 573) was comparable to F400 activated carbon and slightly greater than another synthetic resin (Ambersorb 563). The TOC of produced water samples reached 100 mg/L at pH 9 and 47 mg/L at pH 4 after adsorption treatment using Ambersorb 573 synthetic resin.

Although the description above describes the treatment of produced water, the systems and methods may also be used to treat other aqueous media containing organic contaminants.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for removing organics from aqueous media, said method comprising the steps of:
    (A) treating the aqueous media in a first phase by acidifying the aqueous media to de-solubilize dissolved organics and separating de-solubilized organics from the aqueous media by filtration; and (B) treating the aqueous media directly resulting from step (A) in a second phase by contacting the aqueous media with activated carbon having at least 50% of its pores by number with a pore diameter in a range of about 10 to about 20 Angstroms.

2. The method of claim 1, wherein the activated carbon has at least 50% of its pores by number with a pore diameter in the range from about 12 to about 17 Angstroms or a high volume of pores in this range.

3. The method of claim 1, wherein the activated carbon has a positively charged surface.

4. The method of claim 1, wherein the aqueous media is acidified in the first phase to a pH value of from about 4 to about 6.

5. The method of claim 1, wherein the de-solubilized organics are separated by filtration with a ceramic membrane.

6. The method of claim 1 comprising contacting the aqueous media with biological activated carbon.

7. The method of claim 6 comprising two stages of activated carbon treatment wherein one of the stages is a biological activated carbon.

8. The method of claim 7, wherein the biological activated carbon stage is after the activated carbon stage.

9. The method of claim 7, wherein the biological activated carbon stage is before the activated carbon stage.

10. The method of claim 1 wherein the aqueous media is treated via adsorption.

11. The method of claim 1, wherein the aqueous media is acidified in the first phase to a pH of from about 3 to about 7.

12. The method of claim 1 wherein the aqueous media comprises produced water.

* * * * *